United States Patent Office 3,453,455
Patented July 1, 1969

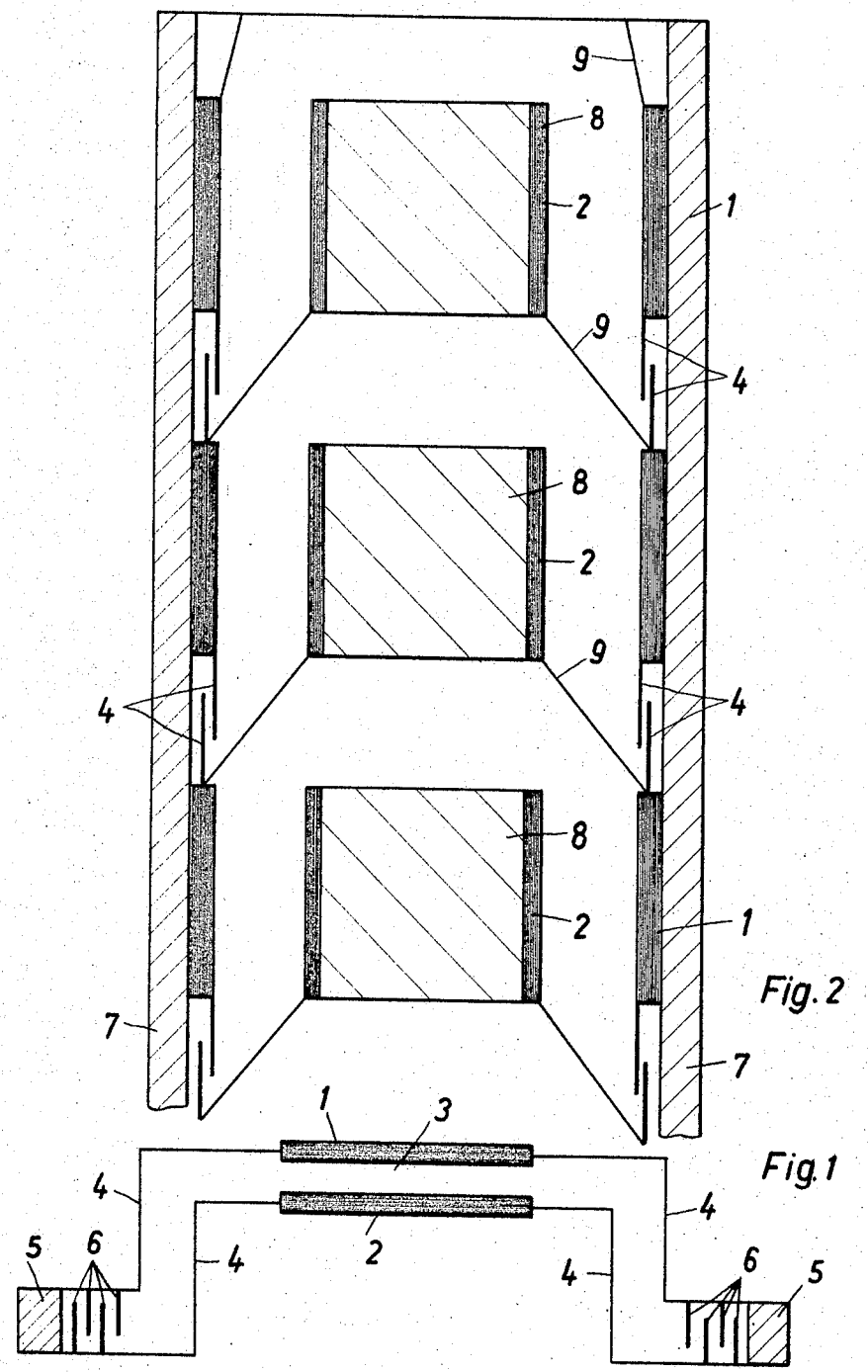

3,453,455
THERMIONIC ENERGY CONVERTER
Reinhart Langpape, Mannheim, and Alfred Jester, Speyer, Germany, assignors to Brown, Boveri & Cie Aktiengesellschaft, Mannheim-Kafertal, Germany, a corporation of Germany
Filed Mar. 9, 1966, Ser. No. 533,020
Claims priority, application Germany, May 3, 1965, B 81,711
Int. Cl. H02n 3/00, 7/00
U.S. Cl. 310—4                    5 Claims Our invention relates to thermionic energy converters. More particularly, it relates to an improved thermionic energy converter having an advantageously long operating life.

Thermionic energy converters comprise two electrodes, viz., an emitter electrode and a collector electrode which are disposed in a vacuum, spaced from each other a short distance, and insulated from each other. These electrodes may have the configuration of plates, concentric cylinders, or the like. The space between them is filled with a vapor such as that of cesium, for example, in order to compensate for space charge.

A thermionic energy converter is operated at temperatures at which the emitter undergoes considerable vaporization with time. In order for the thermionic energy converter to be able to operate, the collector electrode has to be maintained at a temperature which is substantially less than the temperature at the emitter electrode. Consequently, the insulation between the electrodes is at a temperature which is much less than that of the emitter electrode. As a result of such temperature differential, a portion of vaporized emitter electrode material tends to condense upon the surface of the insulation. In time, such condensation adversely affects the insulation and eventually it leads to the short-circuiting of the insulation therefore greatly shortening the operating life of the thermionic energy converter.

Accordingly, it is an important object of this invention to provide a thermionic energy converter in which the insulation between the emitter and collected electrodes thereof is protected from the condensing thereon of vaporized emitter electrode material.

This object is attained by providing a thermionic energy converter comprising electrodes which are insulated from each other and which respectively operate as an emitter and a collector. According to the invention, interleaved sheets are provided between the electrodes which are not in contact with each other but alternately overlap each other, the sheets shielding the surface insulation from the inter-electrode space. Advantageously, these sheets are comprised of the same material as the electrodes and are disposed near the insulation whereby the sheets assume substantially the same temperature as the insulation. Consequently, the material vaporized from the emitter electrode is received on the sheets before it can impinge upon the insulation and condense upon the sheets.

Generally speaking and in accordance with the invention, there is provided a thermionic energy converter comprising an emitter electrode and a collector electrode in opposed spaced relationship. There is further included a wall comprising a portion connected to and extending from the emitter electrode and a portion connected to and extending from the collector electrode. Electrical insulation is provided connecting the extremities of the aforesaid wall portions. A plurality of sheets are included disposed adjacent the inner surface of the insulation, the sheets being arranged in interleaved overlapping spaced relationship, alternately occurring pairs of the sheets being connected to the wall portions respectively.

Also, and in accordance with the invention, there is provided a thermionic energy converter comprising a tube of insulating material with a plurality of thermionic energy converter cells sequentially longitudinally arranged within the tube. Each of the cells comprises a cylindrical collector electrode disposed on the inner wall of the tube and a cylindrical emitter electrode disposed within the collector electrode, each emitter electrode being spaced from and concentrically positioned with respect to its corresponding collector electrode. Each collector and emitter electrode of a cell is longitudinally spaced from the emitter and collector electrodes of adjacent cells, each collector electrode of a cell being connected to the emitter electrode of the adjacent cell. There are further provided respective pluralities of sheets disposed between adjacent collector electrodes opposite the inner wall of the tube, each of the pluralities of sheets comprising at least a pair of sheets which are spaced from and overlap each other, one of a pair of sheets being connected to one of two adjacent collector electrodes, the other of the pair of sheets being connected to the other of the two adjacent collector electrodes. A heater is contained within each of the emitter electrodes.

The foregoing and more specific objects and features of our invention will be apparent from, and will be mentioned in the following description of a thermionic energy converter according to the invention shown by way of example in the accompanying drawing.

In the drawing,

FIG. 1 is a schematic view, partly in section, of an illustrative embodiment of a thermionic energy converter constructed in accordance with the principles of the invention; and FIG. 2 is a schematic view, partly in section, of another embodiment according to the invention.

Referring now to FIG. 1, there is shown therein a single thermionic energy converter cell having plate shaped electrodes 1 and 2. The space 3 between electrodes 1 and 2 is enclosed by a wall 4. The portion of wall 4 which is connected to electrode 1 is mechanically connected to but electrically separated from the portion of wall 4 connected to electrode 2 by insulation 5 which also closes the slits between the wall portions, insulation 5 suitably comprising a ceramic material such as aluminum oxide, for example. The material comprising electrodes 1 and 2 may be of a suitable thermionic emitting type as is well known in the art.

Adjacent insulation 5 is a plurality of sheets 6, the plurality of sheets 6 being comprised of individual interleaved sheets spaced from each other and non-contacting and arranged to alternately overlap each other. Thus, as seen, an alternately occurring pair of sheets terminate in the portion of wall 4 connected to electrode 1 and an alternately occurring pair of sheets terminate in the portion of wall 4 connected to electrode 2, for example. The sheets 6 function to shield the surface of insulation 5 from the plasma contained in space 3. Because sheets 6 are disposed near insulation 5, they assume substantially the temperature of the insulation. Vaporized material from emitter electrode 2 which does not precipitate on collector electrode 1, in the absence of sheets 6, could reach insulation 5 even if it had to traverse a non-straight path, as shown in FIG. 1, since the metal atoms being vaporized from emitter electrode 2 frequently collide with atoms such as cesium atoms present in space 3, whereby the vaporized atoms travel substantially a linear and curved paths.

However, with the inclusion of sheets 6, if vaporized atoms emitted from emitter electrode 2 reach the labyrinth of sheets 6, they are deposited on the sheets, i.e., the vaporized emitter material condenses at the relatively cool sheets 6 and therefore does not get to the surface of insulation 5. Consequently, even with prolonged operation of the thermionic energy converter cell, the insulation is not subject to short-circuiting and its insulating properties and effectiveness are not adversely affected.

In FIG. 2 there is shown a portion of a thermionic energy converter which comprises a plurality of sequentially connected thermionic cells. The individual thermionic cells are disposed within a tube 7 which suitably is comprised of an insulating heat-resistant material. The cylindrical collector electrodes 1 of each cell are disposed against the inner wall of tube 7. The emitter electrodes 2 are also chosen to be of cylindrical configuration and are disposed within, appositely to, spaced from, and concentrically with respective corresponding collector electrodes 1. Emitter electrodes 2 surround respective heat sources 8 which heat the emitter electrodes to the thermionic emitting temperatures. Respective connections 9 respectively connect the collectors of the cells with the emitter electrodes of the immediately superposed cells. Overlapping respective sets of sheets 4 suitably comprised of electrode material, according to the invention, shield the surfaces of insulating tube 7 between adjacent collector electrodes of superposed thermionic cells from the metal vapor produced as a result of the heating of emitter electrodes 2 in the manner as described in connection with the thermionic energy converter cell depicted in FIG. 1. With this arrangement, a short-circuiting between adjacent thermionic cells is prevented as are prevented any deleterious effects on tube 7 with respect to its insulating properties.

The use of sheets as described hereinabove in connection with FIGS. 1 and 2 to protect the insulation in thermionic energy converters is not limited to arrangements as depicted in FIGS. 1 and 2. Since all thermionic energy converters always respectively comprise emitter and collector electrodes which have to be spaced and insulated from each other and have to be operated at relatively high temperatures, the invention can be efficaciously employed in all types of thermionic energy converters.

It will be obvious to those skilled in the art upon studying this disclosure that thermionic energy converters according to our invention permit of a great variety of modifications and hence can be given embodiments other than those particularly illustrated and described herein without departing from the essential features of our invention and within the scope of the claims annexed hereto.

We claim:
1. A themionic energy converter comprising an emitter electrode and a collector electrode in opposed spaced relationship, a wall comprising a portion connected to and extending from said emitter electrode and a portion connected to and extending from said collector electrode, electrical insulation connecting the extremities of said portions and a plurality of sheets disposed adjacent the inner surface of said insulation, said sheets being arranged in interleaved overlapping spaced relationship, alternately occurring pairs of said sheets being connected to said wall portions respectively.

2. A thermionic energy converter as defined in claim 1 wherein said sheets are comprised of the material comprising said electrodes.

3. A thermionic energy converter comprising a tube of insulating material, a plurality of thermionic energy converter cells sequentially longitudinally arranged within said tube, each of said cells comprising a cylindrical collector electrode disposed on the inner wall of said tube and a cylindrical emitter electrode disposed within the collector electrode, each emitter electrode being spaced from and concentrically positioned with respect to its corresponding collector electrode, each collector and emitter electrode of a cell being longitudinally spaced from the collector and emitter electrodes of adjacent cells, each collector electrode of a cell being connected to the emitter electrode of the adjacent cell, respective pluralities of sheets disposed between adjacent collector electrodes apposite the inner wall of said tube, each of said pluralities of sheets comprising at least a pair of sheets which are spaced from and overlap each other, one of said pair of sheets being connected to one of two adjacent collector electrodes, the other of said pair of sheets being connected to the other of said two adjacent collector electrodes, and a heater contained within each of said emitter electrodes.

4. A thermionic energy converter as defined in claim 3 wherein said sheets are comprised of the material comprising said electrodes.

5. A thermionic energy converter as defined in claim 1 wherein said insulation comprises a ceramic material.

References Cited

FOREIGN PATENTS 1,358,001   3/1964   France.

MILTON O. HIRSHFIELD, *Primary Examiner.*

D. F. DUGGAN, *Assistant Examiner.*

U.S. Cl. X.R.

313—205